United States Patent [19]
Slezak

[11] Patent Number: 6,084,745
[45] Date of Patent: Jul. 4, 2000

[54] PELTIER JUNCTION COLD TRAP FOR THE REDUCTION OF HEAD STICTION

[75] Inventor: Arnold G. Slezak, Yukon, Okla.

[73] Assignee: Seagate Technology, Inc, Scotts Valley, Calif.

[21] Appl. No.: 09/138,915

[22] Filed: Aug. 24, 1998

Related U.S. Application Data

[60] Provisional application No. 60/075,821, Feb. 24, 1998.

[51] Int. Cl.[7] .................................................. G11B 17/02
[52] U.S. Cl. .......................................................... 360/97.02
[58] Field of Search ............................... 360/97.02, 97.03

[56] References Cited

U.S. PATENT DOCUMENTS

| | | |
|---|---|---|
| 4,999,736 | 3/1991 | Lieu et al. . |
| 5,734,521 | 3/1998 | Fukudome et al. .................. 360/97.03 |

*Primary Examiner*—Robert S. Tupper
*Attorney, Agent, or Firm*—Shawn B. Dempster; Edward P. Heller; Jonathan E. Olson

[57] ABSTRACT

A cold trap assembly having Peltier Junction assembly is provided to reduce the head stiction between a disc drive head and a disc. The Peltier Junction assembly includes a cold region which has a temperature lower than the ambient temperature of the disc drive. Vapors from outgassing components in the disc drive condense on the cold region, thereby reducing the amount of vapors which may condense on the disc surface.

16 Claims, 3 Drawing Sheets

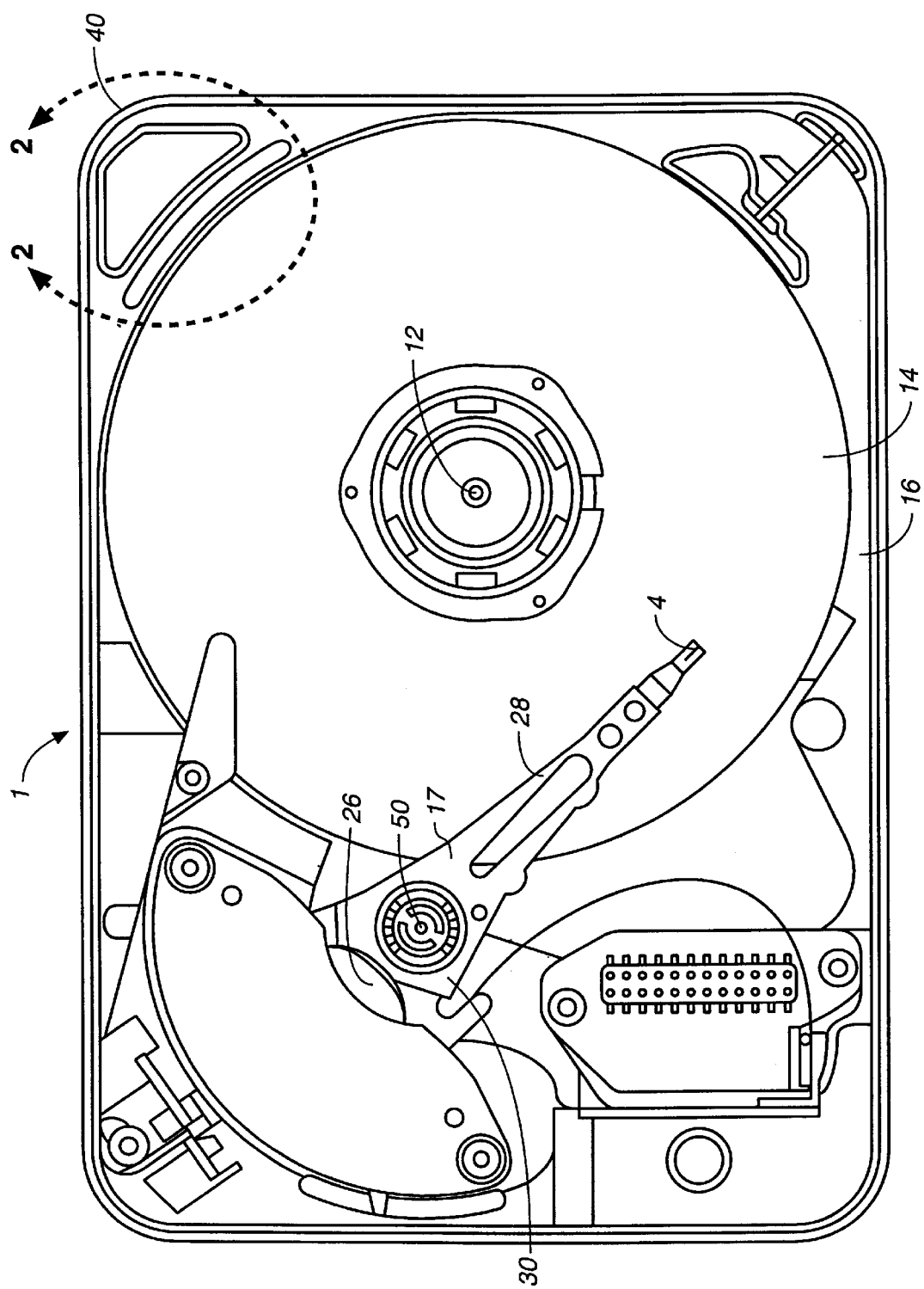
FIG._1

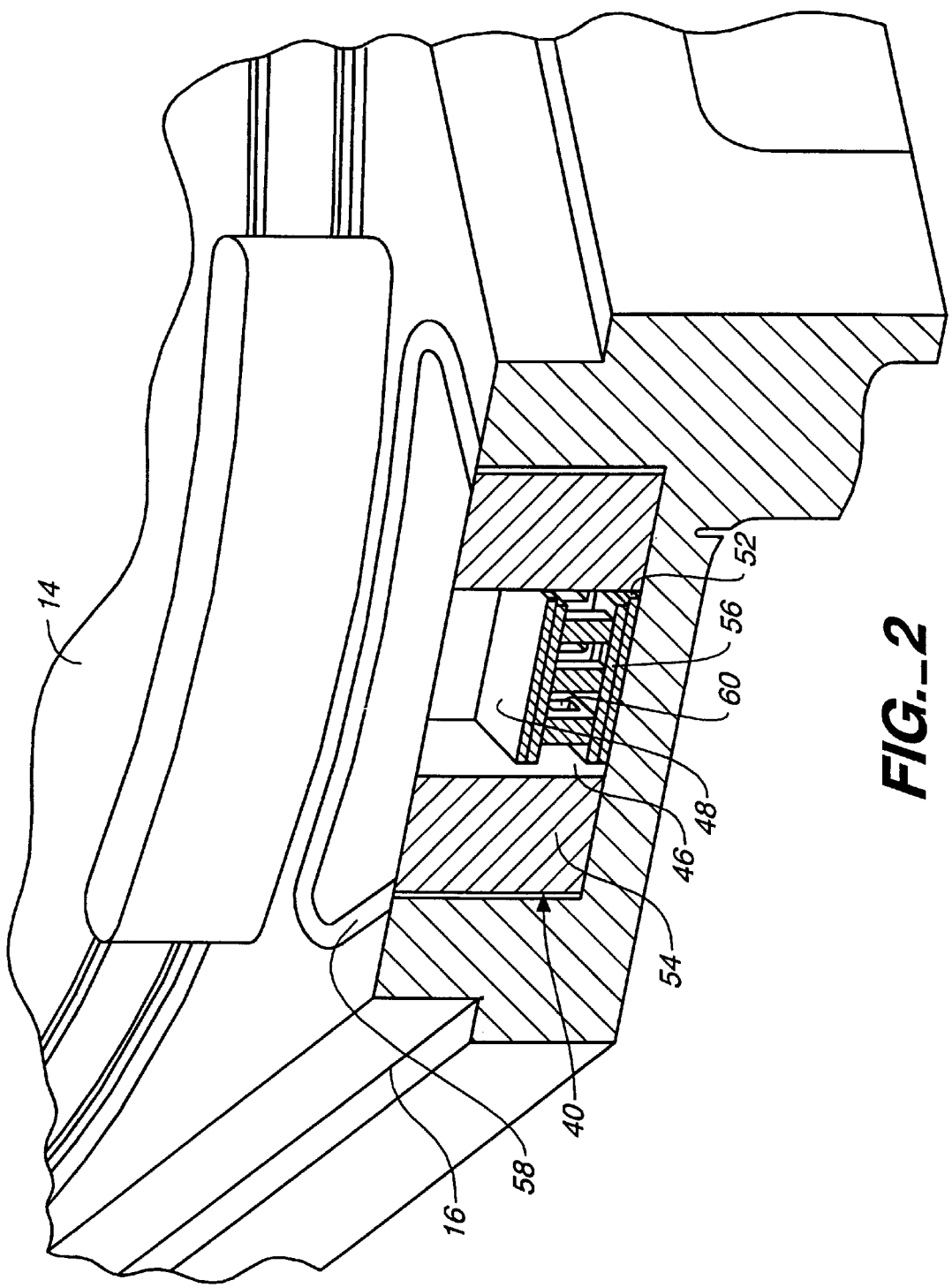
FIG._2

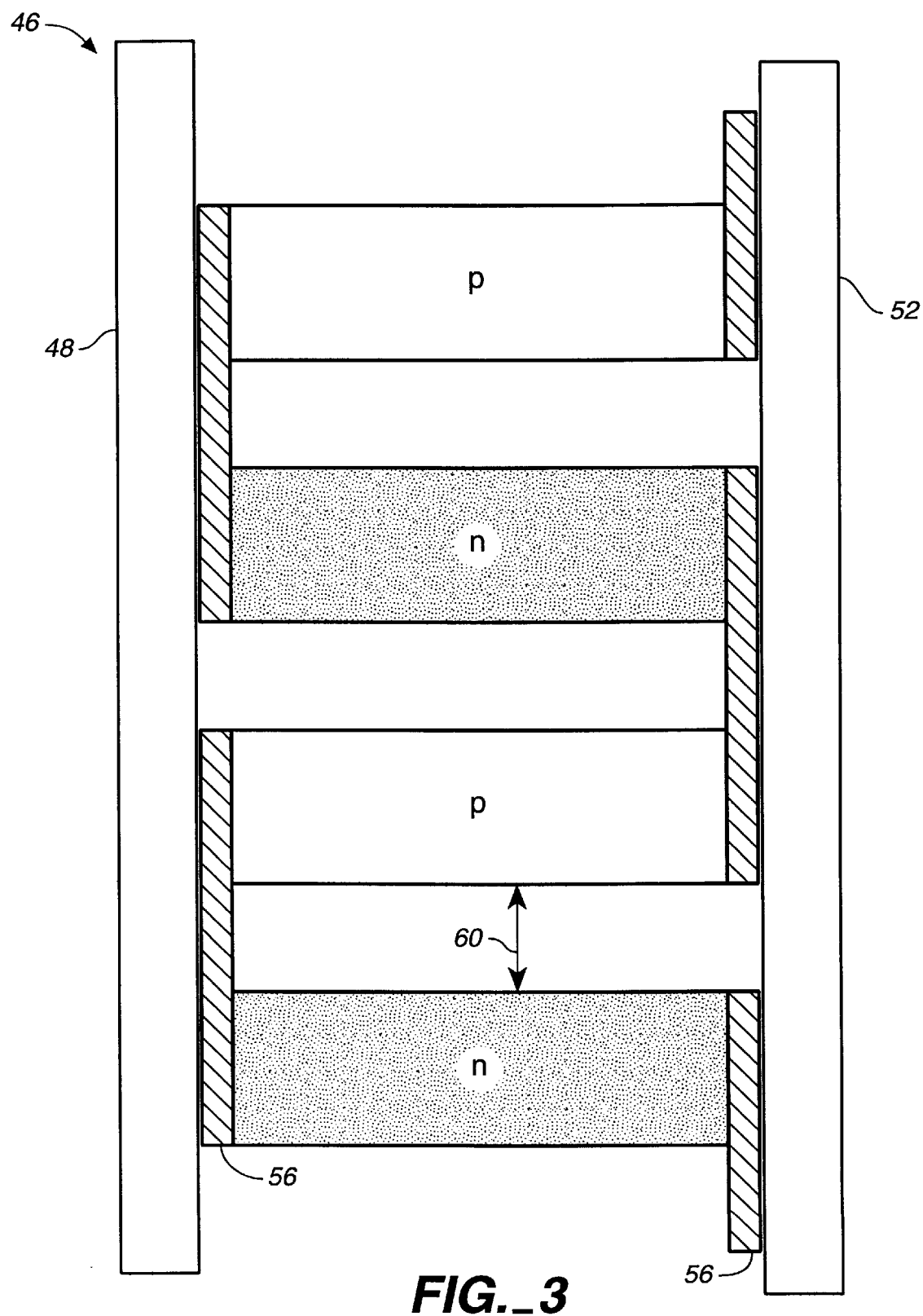
FIG._3

PELTIER JUNCTION COLD TRAP FOR THE REDUCTION OF HEAD STICTION

This application is a continuation of Provisional patent application Ser. No. 60/075,821, filed Feb. 24, 1998, entitled "Peltier Junction Cold Trap For The Reduction Of Head Stiction".

BACKGROUND OF THE INVENTION

The present invention relates generally to an apparatus and method for reducing head stiction in a disc drive, and more particularly, to reducing head stiction caused by outgassing from components in the disc drive.

Hard disc drive storage devices have been used in computer systems for many years. In a disc drive, a disc is rotated by a spindle motor which supports the disc. The rotation of the disc creates a thin film of air over the surface of the disc. An actuator positioned adjacent to the disc supports a transducer which reads and writes data to and from concentric tracks of the disc. The transducer, which is incorporated into or supported on a slider, is supported by the thin film of air as it travels over the disc surface. Data storage on the disc is partially a function of the distance between the transducer and the surface of the disc when the disc drive is operating. To increase storage capacity, the transducer is typically positioned close to the surface of the disc (i.e., fly height) such that the dispersion of the interaction between the transducer and the disc surface for each data transition point is minimized.

In order to lower flying heights, the disc surface must be made as smooth as possible. However, the disc surface cannot be made perfectly smooth because of the need to avoid "stiction". For a head-disc assembly ("HDA"), stiction may be defined as the lateral force required to overcome the separation between the slider and the surface of the disc caused by contamination in the HDA.

One known problem in disc drives is that drive heads which support the transducers come into contact with and "stick" to the disc surface when the disc stops rotating. Typically, discs rotate between 5,400 and 10,000 revolutions per minute during normal operation. Disc lubricants may be used to prevent the head from sticking to the disc surface. These lubricants are not sufficient to reduce the stiction caused by components of the disc drive which outgas particulates, especially when the components are subject to heat. Since the HDA is generally located in a relatively sealed environment, outgassed components are subject to a partial equilibrium condition at a given pressure, altitude, and temperature. Thus, the concentration of outgassed material is higher in this environment because these gases are not diluted by external air. During the operation of the disc drive, the atmospheric pressure between the head and the disc increases which also increases the amount of outgassed particulates. The outgassed material has a tendency to condense on cold surfaces, for example, the disc surface. The head at rest surface sticks to the surface of the disc, thereby causing damage to the disc surface because of the affected stiction. Further, the head sticking interferes with the proper flying of the head that can result in either head crashes or improper recording during head operation. Stiction also occurs if the head and disc surfaces are too smooth. In this case, molecules tend to migrate between the two surfaces and eventually join the two surfaces under sufficient temperature and pressure.

When liquid lubricants are introduced to reduce wear during the context start/stop (CSS), stiction is even higher than when no liquid is present at the disc surface. Thus, it is desirable that the head-disc and interface have both low wear from the head landing on, or periodically contacting the surface of the disc, and low stiction, so that the rotation of the disc can be restarted after the disc has been stopped without damage.

Recently, the magnetic storage industry has continued the trend towards higher storage capacity by lowering the flight height of the read/write head over the disc surface. Factors that affect stiction of a HDA include head load, slider size, surface roughness, geometrical conformity between slider and disc. Other factors include the physical and chemical properties of lubricants and lubricant film thickness, physical and chemical properties of slider and disc overcoat materials, and environmental factors such as temperature and humidity.

Several methods are known for reducing head stiction. One such method is to pulse the spindle motor at the resonant frequency of the disc to provide a force which may "unstick" the head. Similarly, the motor may also be pulsed at the resonant frequency of the disc. One disadvantage to these methods is that the creation of the resulting force may cause damage to the head, transducer, or other suspensions in the disc drive.

In another method, a cam or ramp may be used to lift the head off the disc when the disc drive is powered down. In another method, the contamination levels on components may be tightly controlled or materials with low outgassing properties may be used during the manufacture of the disc drive. In another method, recirculating chemical filters are used to filter out contaminants, including outgassed materials. In other methods, components such as the actuator coil are enclosed in order to reduce the stiction caused by the outgassing.

Therefore, a need exists for a method and apparatus to reduce contamination levels in a disc drive which is efficient and low cost.

SUMMARY OF THE INVENTION

In general, the invention discloses a cold trap assembly for reducing head stiction between a drive head and a disc in a disc drive. The cold trap assembly includes a Peltier Junction assembly. Vapors from outgassing components in the disc drive are caused to condense on a portion of the cold trap assembly, thereby reducing the amount of particulates from the vapors which may condense on the disc surface.

In one aspect, the invention is directed to a cold trap attached to a base plate in the disc drive. The cold trap includes a top plate and a bottom plate coupled to the base plate. A plurality of metal strips are connected to a portion of the top plate and bottom plate. The top and bottom plates and the metal strips form a Peltier Junction to reduce the amount of contamination in the disc drive.

Implementations of the invention include one or more of the following. The temperature of the top plate is less than the temperature of the bottom plate. The bottom plate may have a temperature between −40° C. and 70° C. The cold trap may include a porous membrane attached to a portion of the top plate. The cold trap may also include a heat sink attached to a portion of the base plate. A sponge may be coupled to a portion of the top plate. The top and bottom plate may each have a width of about a quarter inch and may be fabricated from ceramic. The plurality of metal strips may be fabricated from copper.

In another aspect, the invention is directed to a disc drive with head stiction which includes a base. A disc is rotatably coupled to the base, and an actuator is fixed relative to the disc to move a head across the disc to read and write data to/from the disc. A cold trap is attached to the base to reduce stiction between the head and the disc.

Implementations of the invention include one or more of the following. The cold trap assembly includes a Peltier Junction assembly. A portion of the cold trap assembly may have a temperature lower than an ambient temperature of the disc drive. The cold trap assembly may have a current to supply a current to the Peltier Junction.

In yet another aspect, the invention is directed to a method for reducing head stiction in a disc drive having a base plate. The method includes providing a top plate and a bottom plate coupled to the base plate. A plurality of metal strips are mounted to a portion of the top plate and the bottom plate. A Peltier Junction is formed from the top plate, bottom plate, and the plurality of metal strips and a current is applied to the Peltier Junction to cause gas inside the disc drive to condense onto a portion of the top plate.

Implementations of the invention include one or more of the following. A heat sink may be attached to the bottom plate to absorb heat from the bottom plate. A porous membrane may be coupled to a portion of the top plate. At least one sponge may be connected to a portion of the top plate to absorb the condensed gas.

Other advantages and features of the present invention will become apparent from the following description, including the drawings and claims.

BRIEF DESCRIPTION OF THE DRAWINGS

FIG. 1 is a top view of a disc drive having a cold trap in accordance with a preferred embodiment of the present invention.

FIG. 2 is a cross-sectional view of the disc drive showing the Peltier Junction of the cold trap of FIG. 1.

FIG. 3 is an exploded view of the Peltier Junction of FIG. 2.

DESCRIPTION OF THE PREFERRED EMBODIMENTS

FIG. 1 is an exemplary disc drive 1 in accordance with an embodiment of the present invention. A head 4 is shown located generally adjacent to a disc 14, as in a disc drive. In this position, head 4 either reads or writes data to/from tracks of disc 14. Disc 14 is any suitable recording media in the form of a magnetic, magnetic-optical, or optical media.

Disc drive 1 includes a base plate 16 which supports disc 14. Disc 14 typically consists of several stacked discs. Disc 14 is supported by a spindle 12. The spindle 12 may be driven by a conventional servo-motor (not shown) or other suitable motor. The motor, for example, is concentric within the spindle and located directly on base plate 16 beneath disc 14.

Disc drive 1 also includes an actuator 17, a voice coil 26, a comb suspension assembly 28 (also known as an "E-block"), and a magnet structure 30. The voice coil 26 and magnetic structure 30 combine to cause rotation of the actuator 17 about an axis of rotation 50. In one operating regime, the voice coil 26 and suspension assembly 28 are positioned opposite each other such that each rotates about the axis of rotation 50. In another operating regime, voice coil 26 and suspension assembly 28 are positioned such that suspension 28 moves about disc 14 to position head 4 over the tracks (not shown) of disc 14. Head 4 flies over disc 14 on a thin film of air residing between the surfaces. Other forms for head 4 are also suitable.

In operation, especially when subject to heat, components of disc drive 1 outgas particulates, for example, carbon compounds. For example, voice coil 26 may become a heat generator due to the current sent therethrough to cause movement of head 4 from track to track of disc 14. Other components in direct contact with the voice coil, such as suspension assembly 28, are thus also subject to high temperatures as a result of voice coil 26 heating during drive operation. One problem with the gas derived from the outgassed components is that the gas tends to condense on various surfaces of the disc drive 1, for example, the surface of the disc 14. The resulting condensed gas causes a molecule exchange between the head and disc surfaces. As a result, the head may "stick" to the disc surface, thereby resulting in damage to the head or disc or both.

It has been found that a cold trap assembly may be used to minimize the head stiction caused by the outgassed materials within the head-disc assembly. By operating the cold trap assembly at a temperature that is much lower than the ambient head-to-disc assembly temperature, the gaseous outgassed components within the head-disc assembly may condense on a portion of the cold trap assembly, before contacting the head-disc interface.

Referring now to FIG. 2, a cold trap assembly 40 is shown as generally positioned along a peripheral edge of base plate 16. It should be noted that cold trap assembly 40 may also be positioned anywhere inside the head-disc assembly such that at least a portion of the cold trap assembly 40 is exposed to the air flow within the HDA. Cold trap assembly may be connected to base plate 16 using any adhesive or epoxy having sufficient conductive properties. Cold trap assembly 40 may also be connected to base plate 16 by screws (not shown).

Cold trap assembly 40 includes a Peltier Junction assembly 46. Peltier Junction assembly 46 includes a top plate 48 and a bottom plate 52. In the preferred embodiment, top plate 48 and bottom plate 52 have substantially the same size and shape and are about a ¼" (0.625 cm) wide. Top plate 48 and bottom plate 52 are fabricated from a ceramic material, for example, a ceramic substrate, and are preferably square or rectangular. Top plate 48 and bottom plate 52 may also be circular.

Referring now to FIG. 3, Peltier Junction assembly 46 includes a plurality of PN junctions 60 positioned between top plate 48 and bottom plate 52 in a well-known manner. Top plate 48 and bottom plate 52 are also lined with metal strips 56. Metal strips 56 are preferably electrical conductive strips, for example, copper strips, which passes an applied current through the PN junction 60.

In one operating regime, the current from an energy source (not shown) is applied to Peltier Junction assembly 46 through metal strips 56. The applied current causes the minority carriers to drift across the PN junction 60 toward bottom plate 52. These minority carriers increase the amount of thermal energy at base plate 52. Consequently, the amount of thermal energy at top plate 48 is reduced. Thus, top plate 48 has a lower temperature than bottom plate 52.

As mentioned above, a portion of the cold trap assembly 40 must have a temperature which is lower than the internal ambient temperature of the disc drive 1. Generally, the internal temperature of disc drive 1 is between 0° C. to 60° C. When the disc drive is in operation, this temperature may be increased by about 20° C. because of heat generated by, for example, voice coil 26. To achieve a suitable temperature for Peltier Junction 46, a current or a voltage from an energy source (not shown) is applied through metal strips 56, as discussed above. Bottom plate 48 may have a temperature of about −40° C. to 70° C. Top plate 48 may have a temperature of about 50° C. to 100° C. below that of the bottom plate. In this operating regime, vapors from the outgassing components of disc drive 1 condense on top plate 48.

A heat sink may be attached to bottom plate 52 to direct heat from bottom plate 52 into base plate 16 of the head-disc assembly. Cold trap assembly 40 may also include sponges 54. Sponges 54 are positioned along the sidewalls of Peltier Junction assembly 46 such that any condensed liquid from top plate 48 is absorbed, thereby preventing any excess liquid resting on top plate 48 from contacting the surface of disc 14. Sponge 54 may also be any other suitable material which can absorb condensed liquid.

Cold trap assembly 40 may also include a porous membrane 58, for example, polytetrafluoroethylene (PTFE) membrane. As shown in FIG. 2, membrane 58 extends between the top and bottom surfaces of cold trap assembly 40. Membrane 58 may be connected to the cold trap assembly 40 using any suitable adhesive with low outgassing characteristics. Suitable adhesives include acrylic pressure sensitive adhesives. Membrane 58 allows vapors from the outgassing components to pass therethrough, but also traps the condensed liquid inside cold trap assembly 40.

The number of the embodiments of the present invention have been described. Nevertheless, it will be understood that various modifications may be made without departing from the spirit and scope of the invention. Accordingly, other embodiments are within the scope of the following claims.

What is claimed is:

1. An apparatus to reduce head stiction resulting from a contaminative material in a disc drive, the disc drive having a cold trap attached to a base plate, the cold trap comprising:
   a pair of plates supported by the base plate;
   a plurality of metal strips connected between the pair of plates, the plates and strips forming a Peltier Junction assembly;
   an electrical source able to provide electrical current through the metal strips so that a region of the assembly becomes cooler than the interior of the disc drive, causing the contaminative material to accumulate thereon; and
   a porous material positioned positioned to trap the accumulated material in the disc drive.

2. The apparatus of claim 1, wherein the pair of plates comprises a cooled plate and a heated plate.

3. The apparatus of claim 1, the porous material comprising a porous membrane connected to a portion of the Peltier Junction assembly.

4. The apparatus of claim 1, wherein each of the pair of plates is made of ceramic and said plurality of metal strips are made of copper.

5. The apparatus of claim 1, wherein the pair of plates each have a width of about ¼".

6. The apparatus of claim 1, further comprising a heat sink attached to a portion of the base plate.

7. The apparatus of claim 1, the porous material comprising at least one sponge adjacent to the Peltier Junction assembly.

8. An apparatus of claim 2, wherein the bottom plate has a temperature between −40° C. and 70° C.

9. A disc drive comprising:
   a base;
   a disc rotatably coupled to the base;
   an actuator fixed relative to the disc for moving a head across the disc to read and write data to/from the disc; and
   a cold trap including a Peltier Junction assembly supported by the base;
   an electrical source configured to provide electrical current through the Peltier Junction assembly, cooling a region of the assembly so that a contaminative material accumulates thereon; and
   a porous material positioned to trap the contaminative material.

10. The disc drive of claim 9, wherein a portion of the cold trap has a temperature lower than an ambient temperature of the disc drive.

11. A disc drive assembly comprising:
   a disc stack including at least one disc positioned within a chamber containing a gas containing a contaminant; and
   a cold trap means for trapping the contaminant by cooling the gas to a temperature below an ambient temperature within the chamber so that the contaminant penetrates a porous material away from the disc stack.

12. A method for reducing head stiction in a disc drive comprising:
   forming a Peltier Junction assembly from a plurality of metal strips mounted between first and second plates;
   applying a current to said Peltier Junction assembly, cooling a portion of the Peltier Junction assembly to a temperature lower than the interior of the disc drive so that a contaminative accumulates on the assembly; and
   trapping the contaminative with a porous material.

13. The method of claim 12, wherein the temperature of said first plate is lower then the temperature of said second plate.

14. The method of claim 13, further comprising attaching a heat sink to said second plate to absorb heat from said second plate.

15. The method of claim 12 in which the porous material comprises a porous membrane, and in which the step of trapping comprises coupling a porous membrane to the Peltier Junction assembly.

16. The method of claim 12 in which the porous material comprises at least one sponge, and in which the step of trapping comprises coupling the at least one sponge to the Peltier Junction assembly.

\* \* \* \* \*